United States Patent
Callahan, II et al.

(10) Patent No.: US 6,665,688 B1
(45) Date of Patent: Dec. 16, 2003

(54) METHOD AND SYSTEM FOR AUTOMATICALLY REGENERATING DATA ON-DEMAND

(75) Inventors: Charles David Callahan, II, Seattle, WA (US); Brian D. Koblenz, Seattle, WA (US)

(73) Assignee: Cray Inc., Seattle, WA (US)

( * ) Notice: Subject to any disclaimer, the term of this patent is extended or adjusted under 35 U.S.C. 154(b) by 0 days.

(21) Appl. No.: 09/221,029

(22) Filed: Dec. 23, 1998

(51) Int. Cl.$^7$ .............................. G06F 12/00; G06F 9/44
(52) U.S. Cl. ........................................ 707/200; 717/116
(58) Field of Search ................. 707/8, 3, 10, 101–200; 717/3, 11, 5, 10, 116, 151, 145

(56) References Cited

U.S. PATENT DOCUMENTS

| | | |
|---|---|---|
| 4,819,234 A | 4/1989 | Huber |
| 5,168,554 A | 12/1992 | Luke |
| 5,301,325 A | 4/1994 | Benson |
| 5,333,280 A | 7/1994 | Ishikawa et al. |
| 5,450,575 A | 9/1995 | Sites |

(List continued on next page.)

FOREIGN PATENT DOCUMENTS

| DE | 19710252 | 2/1998 |
|---|---|---|

OTHER PUBLICATIONS

Authors: Clovis L. Tondo, Andrew Nathanson and Eden Yount; Title: Mastering Make—A Guide to Building Programs on DOS and Unix Systems; Date:1992; Publisher: PTR Prentice Hall, Inc.; Chapters: 1–5.*

Jack W. Davidson and David B. Whalley, "Reducing the Cost of Branches by Using Registers," Proceedings of the 17$^{th}$ Annual Symposium on Computer Architecture, Seattle, Washington, May 28–31, 1990.

Jens Knoop, et al., "The Power of Assignment Motion," ACM SIGPLAN '95 Conference on Programming Language Design and Implementation, La Jolla, California, Jun. 18–21, 1995.

Hiralal Agrawal, "Dominators, Super Blocks, and Program Coverage," 21$^{st}$ ACM SIGPLAN–SIGACT Symposium on Principles of Programming Languages, Portland, Oregon, Jan. 17–21, 1994.

Tomas Lang and Miquel Huguet, "Reduced Register Saving/Restoring in Single–Window Register Files," Computer Architecture News, vol. 14, No. 3, Jun. 1986.

Lal George and Andrew W. Appel, "Iterated Register Coalescing," ACM Transactions on Programming Languages and Systems, vol. 18, No. 3, May 1996, pp. 300–324.

Fred C. Chow and John L. Hennessy, "The Priority–Based Coloring Approach to Register Allocation," ACM Transactions on Programming Languages and Systems, vol. 12, No. 4, Oct. 1990, pp. 501–536.

(List continued on next page.)

*Primary Examiner*—Uyen Le
*Assistant Examiner*—Te Yu Chen
(74) *Attorney, Agent, or Firm*—Perkins Coie LLP

(57) ABSTRACT

A replay method and system for monitoring the generating of a data set from input data sets and, when the data set is subsequently accessed, automatically regenerating the data set if the data set is out-of-date. The replay system only regenerates those input data sets that are determined to be out-of-date and only regenerates the output data set if it is determined to be out-of-date. A data set is determined to be out-of-date only when an input data set has actually changed since the data set was last generated.

Preston Briggs et al., "Coloring Heuristics for Register Allocation," Department of Computer Science, Rice University, Houston, Texas, Jun. 1989.

Preston Briggs et al., "Coloring Register Pairs," ACM Letters on Programming Languages and Systems, vol. 1, No. 1, Mar. 1992, pp. 3–13.

58 Claims, 11 Drawing Sheets

U.S. PATENT DOCUMENTS

| | | | |
|---|---|---|---|
| 5,533,192 A | | 7/1996 | Hawley et al. |
| 5,564,051 A | * | 10/1996 | Halliwell et al. ............ 707/200 |
| 5,581,764 A | * | 12/1996 | Fitzgerald et al. ............. 717/3 |
| 5,598,560 A | | 1/1997 | Benson |
| 5,632,032 A | | 5/1997 | Ault et al. |
| 5,652,889 A | | 7/1997 | Sites |
| 5,754,855 A | | 5/1998 | Miller et al. |
| 5,768,591 A | | 6/1998 | Robinson |
| 5,768,592 A | | 6/1998 | Chang |
| 5,774,721 A | | 6/1998 | Robinson |
| 5,787,245 A | | 7/1998 | You et al. |
| 5,805,892 A | | 9/1998 | Nakajima |
| 5,812,811 A | | 9/1998 | Dubey et al. |
| 5,826,265 A | * | 10/1998 | Van Huben et al. ............. 707/8 |
| 5,854,932 A | * | 12/1998 | Mariani et al. ............. 717/116 |
| 5,867,643 A | | 2/1999 | Sutton |
| 5,877,766 A | | 3/1999 | Bates et al. |
| 5,887,166 A | | 3/1999 | Mallick et al. |
| 5,901,315 A | | 5/1999 | Edwards et al. |
| 5,903,730 A | | 5/1999 | Asai et al. |
| 5,913,925 A | | 6/1999 | Kahle et al. |
| 5,953,530 A | | 9/1999 | Rishi et al. |
| 5,961,639 A | | 10/1999 | Mallick et al. |
| 5,966,539 A | | 10/1999 | Srivastava |
| 5,978,902 A | | 11/1999 | Mann |
| 6,002,872 A | | 12/1999 | Alexander, III et al. |
| 6,002,879 A | | 12/1999 | Radigan et al. |
| 6,009,269 A | | 12/1999 | Burrows et al. |
| 6,029,005 A | | 2/2000 | Radigan |
| 6,049,671 A | * | 4/2000 | Slivka et al. ................. 717/11 |
| 6,058,493 A | | 5/2000 | Talley |
| 6,059,840 A | | 5/2000 | Click, Jr. |
| 6,072,952 A | | 6/2000 | Janakiraman |
| 6,094,716 A | | 7/2000 | Jung |
| 6,101,524 A | | 8/2000 | Choi et al. |
| 6,112,293 A | | 8/2000 | Witt |
| 6,151,701 A | | 11/2000 | Humphreys et al. |
| 6,151,704 A | | 11/2000 | Radigan |
| 6,314,559 B1 | * | 11/2001 | Sollich ........................... 717/5 |

OTHER PUBLICATIONS

Ji Minwen et al., "Performance Measurements for Multithreaded Programs," SIGMETRICS '98, ACM, 1998, pp. 168–170.

Jonathan E. Cook and Alexander L. Wolf, "Event Based Detection of Concurrency," SIGSOFT '98, ACM, 1998, pp. 35–45.

Jenn–Yuan Tsai et al., "Performance Study of a Concurrent Multithreaded Processor," IEEE, 1998, pp. 24–35.

"Method of Tracing Events in Multi–Threaded OS/2 Applications," IBM Tech. Disclosure Bulletin, Sep. 1993, pp. 19–22.

Priyadarshan Kolte and Mary Jean Harrold, "Load/Store Range Analysis for Global Register Allocation," ACM, Jun. 1993.

SangMin Shim and Soo–Mook Moon, "Split–Path Enhanced Pipeline Scheduling for Loops with Control Flows," IEEE, Dec. 2, 1998.

David Callahan and Brian Koblenz, "Register Allocation via Hierarchical Graph Coloring," Proceedings of the ACM SIGPLAN '91 Conference on Programming Language Design and implementation, Toronto, Canada, Jun. 26–28, 1991.

Tera MTA, Principles of Operation, Nov. 18, 1997.

Kenneth J. Goldman, "Introduction to Data Structures," 1996 (retrieved from the Internet, http://www.cs.wustl.edu{kjg/CS101_SP97/Notes?DataStructures/structures.html.

Ashwin Ram and Janak H. Patel, "Parallel Garbage Collection Without Synchronization Overhead," 12th Annual Symposium on Computer Architecture, Jun. 17, 1985.

H. Hayashi et al., "ALPHA: A High Performance Lisp Machine Equipped with a New Stack Structure and Garbage Collection System," 10th Annual International Symposium on Computer Architecture, 1983.

* cited by examiner

METHOD AND SYSTEM FOR AUTOMATICALLY REGENERATING DATA ON-DEMAND

TECHNICAL FIELD

The present invention relates generally to a computer system for the generating data and, more particularly, to regenerating data on-demand.

BACKGROUND OF THE INVENTION

Computer systems are often used to generate vast amounts of data. Computer programs often input data and generate output data corresponding to that input data. In complex computer systems, many computer programs may be used to generate data based on data generated from other computer programs. These computer programs for generating the data are referred to as "tools" or "services." A description of such complex computer systems will help illustrate the computational inefficiencies that are often encountered. One such complex computer system may be a management information system ("MIS") for a large organization. The MIS may collect raw data that is generated at various locations throughout the organization. The MIS may have a variety of report generating tools that input subsets of the raw data and may generate reports. A report itself may be stored as a data set and used as input into another report generating tool. Thus, the reports and the raw data combine to form a hierarchy of data sets. The various reports may be accessible to managers at different levels within the organization. For example, a low-level manager may need access to a detailed report relating to a specific location within the organization, whereas a high-level manager may need a high-level report that summarizes the detailed reports of many locations. When a manager requests that the MIS system generate a report, it may be important that the report is up-to-date. However, it may be very computationally expensive to regenerate all intermediate reports that are used to generate the requested report. It would be desirable to have a technique that would ensure that a requested report is up-to-date, but that would avoid the high computational expense of regenerating all the intermediate reports.

Another such complex computer system is a development environment for computer programs. The development environment allows programs to write, compile, debug, and maintain computer programs. The development environment may use a word processor to generate the source code for the computer program, a parser to generate an intermediate representation of the computer program from the source code, a translator to generate object code from the intermediate representation, an optimizer to generate optimized object code from the object code, and a linker to link optimized object code from different functions into executable code. Large computer programs, such as operating systems, can have thousands of functions which need to be compiled and linked into executable code. The process of compiling and linking such large computer programs can be very computationally intensive. As a result, the compiling and linking of the large computer program can take a very long time and have a significant negative impact on the development of the computer program. For example, if a new executable code is needed because of changes to the source code of the computer program, the source code for each of the functions may need to be parsed, translated, optimized, and linked to generate executable code that is up-to-date. Such generation of executable code may take many hours of computer time, which can significantly slow the development of the computer programs. Some tools for the development system may be able to check the time when an input (e.g., source code) for the tool (e.g., parser) was last written. If all the input that is used to generate an output (e.g., intermediate representation) was not written since the output was last written, then the tool does not need to regenerate the output because it is already up-to-date. If, however, one of the inputs was written after the output was last written, then output may be out-of-date and the tool needs to regenerate the output. Although such tools help to reduce the time needed to generate the executable code, it would be desirable to further reduce that time.

SUMMARY OF THE INVENTION

Embodiments of the present invention provide a replay method and system for monitoring the generating of a data set from input data sets and, when the data set is subsequently accessed, automatically regenerating the data set if the data set is out-of-date. The replay system only regenerates those input data sets that are determined to be out-of-date and only regenerates the output data set if it is determined to be out-of-date. A data set is determined to be out-of-date only when an input data set has actually changed since the data set was last generated.

DETAILED DESCRIPTION OF THE INVENTION

Figure 1A:
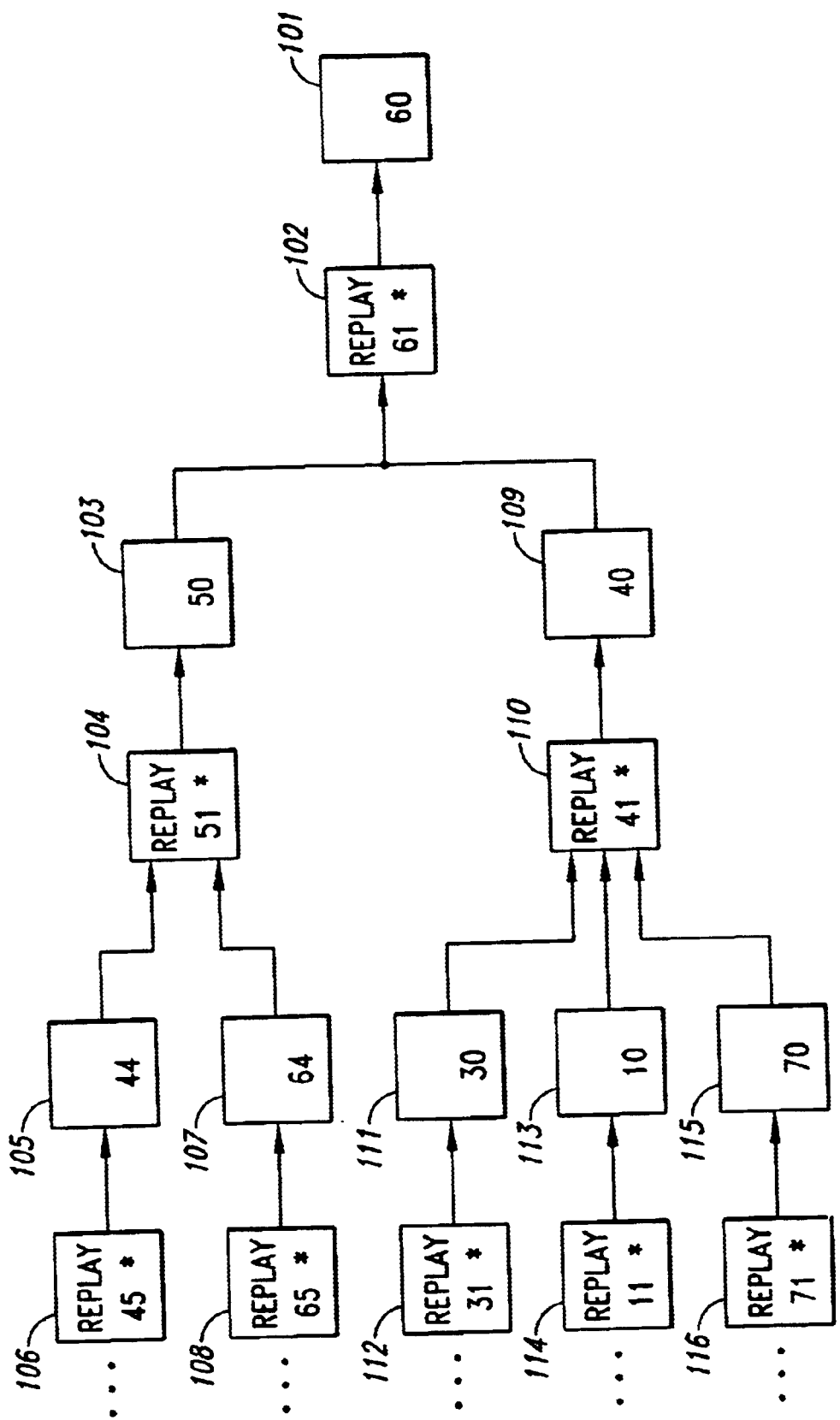
FIGS. 1A–1C illustrate the replaying of a session.

Embodiments of the present invention provide a replay method and system for monitoring the generating of a data set from input data sets and, when the data set is subsequently accessed, automatically regenerating the data set if the data set is out-of-date. The replay system only regenerates those input data sets that are determined to be out-of-date and only regenerates the output data set if it is determined to be out-of-date. A data set is determined to be out-of-date only when an input data set has actually changed since the data set was last generated.

The replay system monitors the generating of data sets so that it knows how to regenerate the data set if one of its input data sets has changed. When the replay system monitors the generation of a data set, it records information describing how the data set is generated. The generating of a data set is referred to as a "session." During a session, the replay system records which data sets are input data sets from which the data set is generated and records which service (e.g., computer program) is used to generate the data set from the input data sets. When the data set is initially generated, the service initializes a session and notifies the replay system of the input data sets, of the generating service, of the output data set, and of any arguments passed to the service to control the generation of the output data set. To generate the output data set, the generating program invokes session routines provided by the replay system to record all the information that is necessary to "replay" the session when the data set needs to be updated, that is when the data set is accessed and it is out-of-date. When the data set is accessed (e.g., as input to the generation of a different data set), the replay system determines whether the accessed data set may be out-of-date. A data set may be out-of-date when any of its input data sets has changed since the session was last replayed or any of its input data sets are themselves out-of-date. To replay the session that generated the accessed data set, the replay system first ensures that all the input data sets of the session are up-to-date. After the replay system ensures that the input data sets are up-to-date, the replay system determines whether any of the input data sets have changed since the session was last replayed. If an input data set has changed, then the replay system replays the session to regenerate the data set to be accessed so that it can be ensured that it is up-to-date. The process of ensuring that an input data set is up-to-date may require the replaying of the session that was used to generate that input data set. Before replaying that session, the replay system ensures that its input data sets are also up-to-date. Thus, the replay system will replay any session whose output data set needs to be updated and is used directly or indirectly to regenerate the accessed data set. In this way, data sets are regenerated on-demand when they are needed and only those data sets that are actually needed as input are regenerated. Also, the replay system collects all the information necessary to regenerate the data sets when they are generated.

Figure 1B:
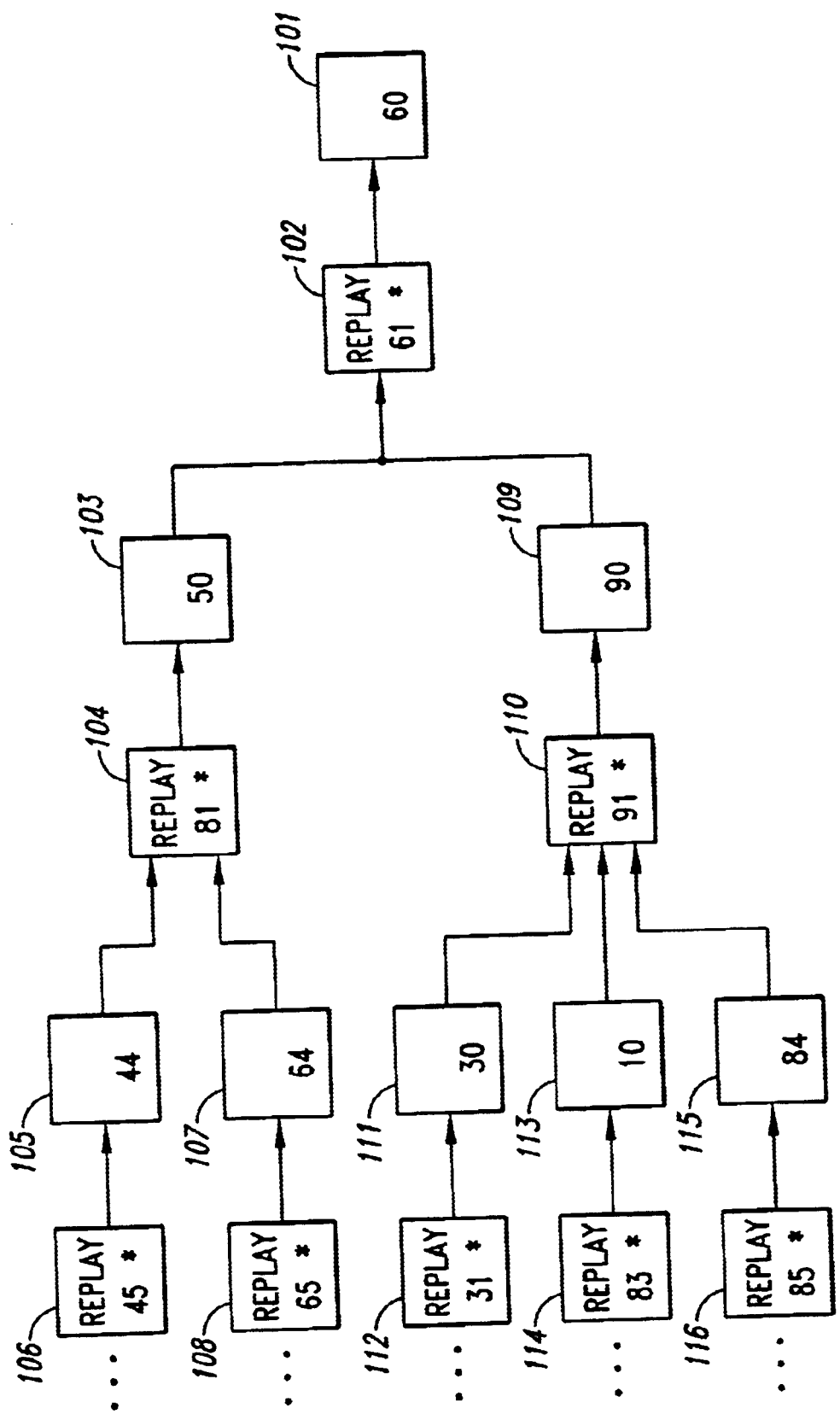
Figure 1C:
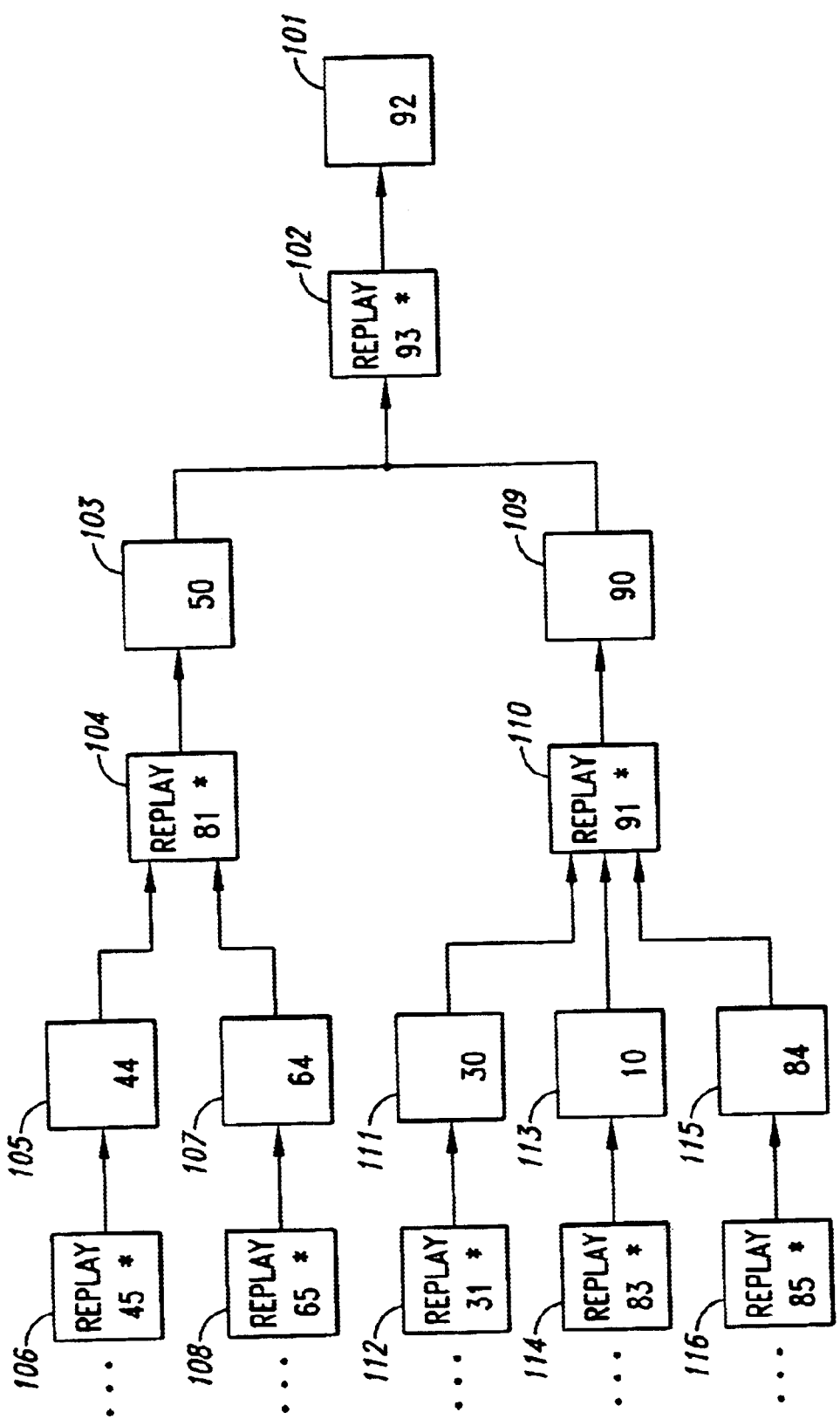

FIGS. 1A–1C illustrate the replaying of a session. Each of the squares represent an object 101–116. These objects contain either a data set or information describing how to replay a session. The objects 102, 104, 106, 108, 110, 112, 114, and 116 represent replay objects that each correspond to a session and contain information describing how to replay the session. The objects 101, 103, 105, 107, 109, 111, 113, and 115 represent data set objects that contain data sets that are input to and output of the various replay objects. For example, data set object 101 is the output of replay object 102, and data set objects 103 and 109 are inputs of the replay object 102. The data set objects 103 and 109 are also outputs of replay objects 104 and 110, respectively. In this example, each replay object has only one output data set object. In general, however, a replay object can have multiple output data set objects. Each object contains a time stamp. The time stamp in the data set objects indicates the time when the data in the data set object was last updated in a way that actually changed the data of the data set object. In particular, if a data set object is regenerated because an input data set object has changed, but that change had no effect on the content of the output data set object, then the replay system does not change the time stamp of the output data set object. The time stamp in the replay objects indicates the time when the session was last replayed or when the data set was initially generated. When determining whether to replay a session, the replay system, after ensuring that the input data sets are up-to-date, checks the time stamp on each of the input data set objects. If the time stamp of input data set object is later than a time stamp of the replay object, then the input data set object has changed since the session represented by the replay object was last replayed. Therefore, the output data set object of that replay object may be out-of-date, and the session used to generate that output data set object needs to be replayed. If a session is replayed, but the output data set is not changed, then the time stamp in the output data set object is not updated. Even though an input data set is regenerated, the replay system can look at its time stamp to determine whether the session that it is input to needs to be replayed. Thus, the replay system can avoid replaying sessions whose input data sets have been regenerated but not charged.

In the example of FIG. 1A, the replay object 102 has a time stamp of 61 and its output data set object 101 has a time stamp of 60. When data set object 101 is accessed, the replay system determines whether data set object 101 is up-to-date. If not up-to-date, the replay system replays the session that generated data set object 101, which is represented by replay object 102. To determine whether data set object 101 is up-to-date, the replay system determines whether the data in the input data set objects 103 and 109 are up-to-date. To make this determination, the replay system determines whether any of the input data set objects to the replay objects for the sessions that generated data set objects 103 and 109 are themselves up-to-date. For example, to determine whether data set object 103 is up-to-date, the replay system determines whether any of the input data set objects 105 and 107 of replay object 104 are up-to-date. The replay system continues this determination for all data sets that are input to a data set that is used to generate data set object 101 either directly or indirectly. For example, data set object 103 is used to directly generate data set object 101, and data set object 105 is used to indirectly generate data set object 101. When it is determined that an input data set object is up-to-date and has a time stamp that is greater than the time stamp of its replay object, the replay system replays the session of the replay object. For example, replay object 104 has a time stamp of 51 and its input data set object 107 has a time stamp of 64. Thus, input data set object 107 has changed since the session for replay object 104 was last replayed. However, the data set object 107 may not necessarily be itself up-to-date. Thus, the replay system needs to ensure that the data set object is up-to-date before it replays the session for replay object 104.

FIG. 1B shows the updated time stamps for the input data set objects 103 and 109. When replay object 104 was replayed, the replay system changed time stamp of replay object 104 to 81. However, because the replaying of the session did not change the contents of output data set object 103, the replay system did not change the time stamp for output data set object 103. Thus, replay object 102 does not need to be replayed as a result of input data set object 103 being regenerated. However, it does need to be replayed as a result of input data set object 109 being regenerated. The time stamp of input data set object 109 is now larger than the time stamp of replay object 102. Thus, the session of replay object 102 needs to be replayed. In determining whether replay object 110 needed to be replayed, the replay system ensured that input data set objects 111, 113, and 115 were up-to-date and then compared their time stamps to the time stamp of replay object 110. Since the time stamp of replay object 110 was initially 41 and the time stamp of data set object 115 was initially 70, then the replay system knew that the replay object needed to be replayed but did not know whether any of its input data sets were up-to-date. The replay system determined that data set object may not have been up-to-date and replayed the session of replay object 116. As indicated by the change in time stamp on date set object 115, contents of data set object 115 was changed when it was regenerated. In contrast, when the session of replay object 114 was replayed, data set object 113 was not changed as indicated by no change in its time stamp.

FIG. 1C illustrates the time stamps after data set object 101 has been updated. The replay system replayed the session of replay object 102, which resulted in a change of data set object 101. Thus, the replay system updated the time stamp for data set object 101. In the process of bringing data set object 101 up-to-date, the replay system replayed the sessions associated with replay objects 102, 104, 108, 110, 114, and 116, but did not replay the sessions associated with replay objects 106 and 112. Thus, rather than regenerating all the data set objects that are used directly or indirectly to generate data set object 101, the replay system only regenerated those data sets that whose input data sets were actually out-of-date.

Figure 2:
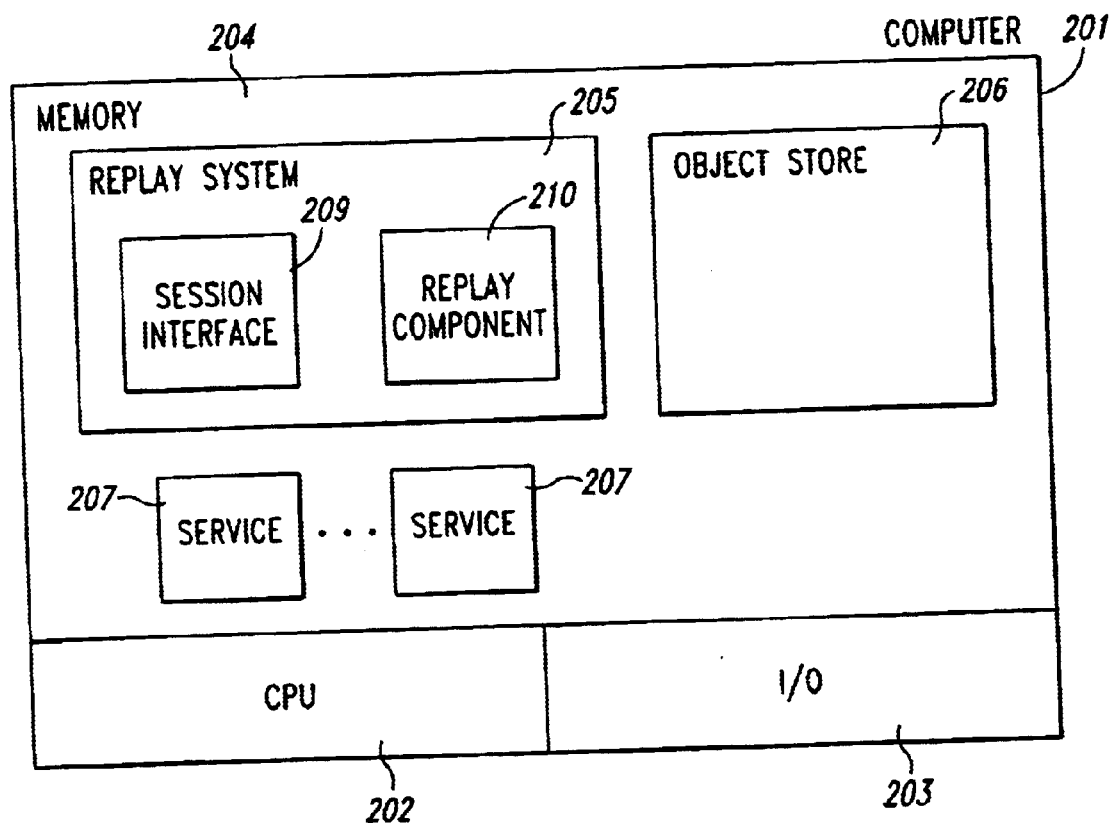
FIG. 2 illustrates a computer system on which the replay system may be executed.

FIG. 2 illustrates a computer system on which the replay system may be executed. The computer system 201 includes a central processing unit 202, input/output devices 203, and memory 204. The memory contains the replay system 205, object store 206, and services 207. The replay system includes session interface 209 and replay component 210. The object store contains data set objects and replay objects that are maintained by the replay. The services are computer programs that are used to generate the object data sets of the object store. A service can be invoked independently from the replay system when, for example, a user wants to update a data set object if it is not currently up-to-date (e.g., in a development environment, the user wants to generate a new executable code). The service uses the replay system to record a session that is used to generate a data set object. When invoked by the replay system during the replay of a session, the service is passed a flag indicating that its input data set objects are up-to-date. When the flag indicates that the input data set objects are up-to-date, the service regenerates the data set objects without checking if the input data set objects are up-to-date. When a data set object in the data store is accessed when determining whether to replay a session, the replay component ensures that the input data set objects of that data set object are up-to-date. If an input data set object has changed since the session for that data set object was last generated, then the replay component replays the session for that data set object.

Figure 3:
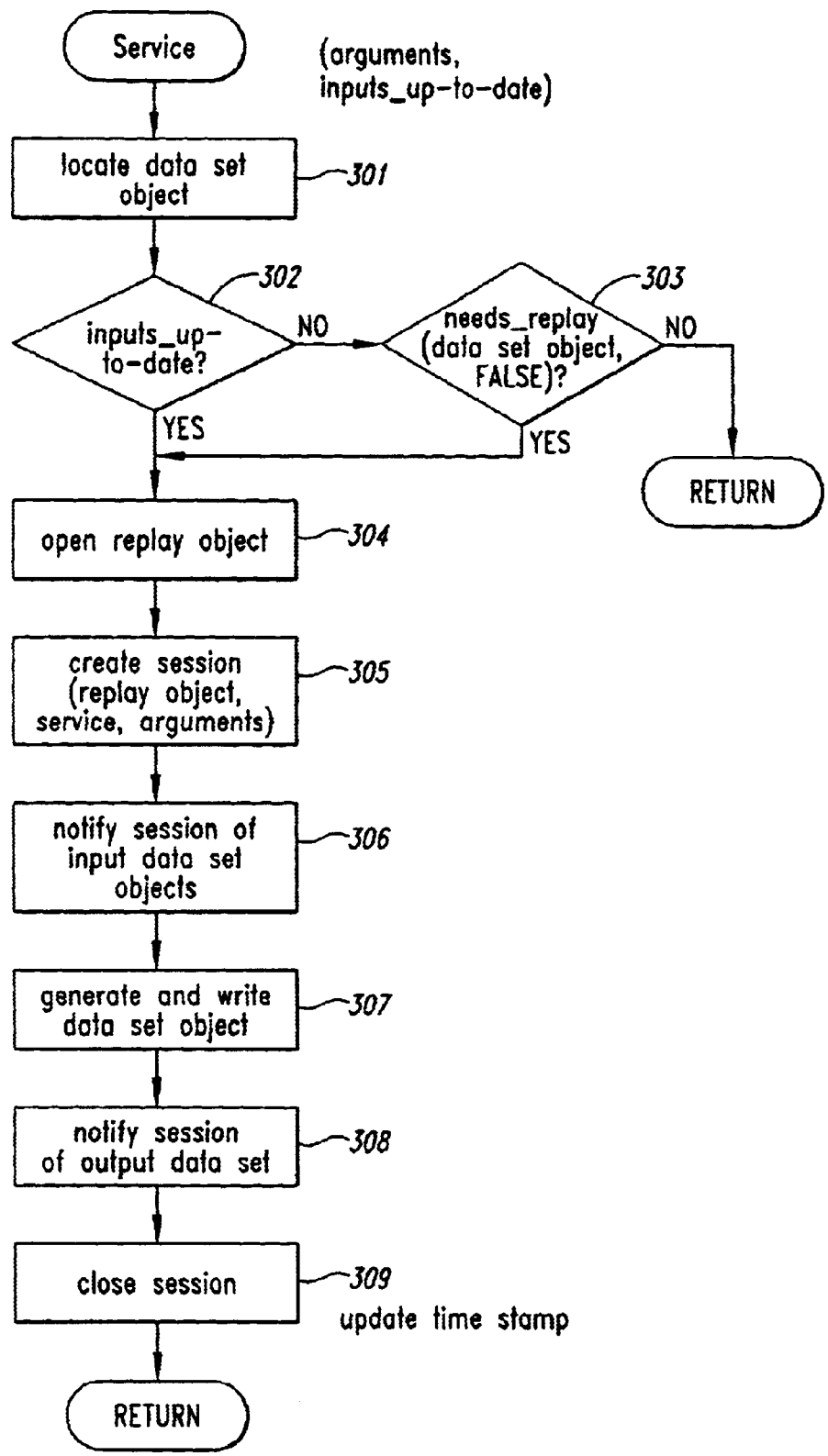
FIG. 3 is a flow diagram illustrating an example implementation of a service.

FIG. 3 is a flow diagram illustrating an example implementation of a service. When the service is executed, it is passed arguments that specify the input data sets, the output data sets, and flags to control the actions performed by the service. The service is also passed a flag indicating whether the input data sets are up-to-date. The service creates a session and regenerates the data set object. If, however, the passed flag indicates that the input are not necessarily up-to-date, then the service ensures that the input data sets are up-to-date. If an input data set has changed since the output data set was last generated, then the service creates a session and regenerates the output data set. In step 301, the service locates the output data set object that is to be updated or creates that output data set object if it does not exist in the object store. In step 302, if the passed flag indicates that the input data set objects are up-to-date, then the service continues at step 304, else the service continues at step 303. In step 303, the service invokes a needs_replay routine passing the output data set object and an indication that the output data set object should not be updated. The routine returns an indication as to whether an input data set object has changed since the output data set object was last generated, and thus the session needs to be replayed. If the output data set object needs to be replayed, then the service continues at step 304, else the service returns. In step 304, the service retrieves the replay object for the located data set object. If no replay object currently exist for the located data set object, then the service creates a replay object in the object store. In step 305, the service requests the replay system to create a session and record the session in the opened replay object. The service also identifies the service that is to be used to regenerate the output data set object when the session is replayed and identifies any arguments that should be passed to the service when the output data set object is regenerated. In step 306, the service notifies the session of the input data set objects that are used to generate the output data set object. In step 307, the service performs the main processing of the service, which includes the generating of the output data set object. In step 308, the service notifies the session of the output data set object. In step 309, the service requests the replay system to close the session. The replay system closes the session by recording in the replay object all the information necessary to regenerate the output data set object. The replay system also updates the time stamp of the replay object and, if the output data set object has changed, the replay system updates the time stamp of the output data set object.

Figure 4:
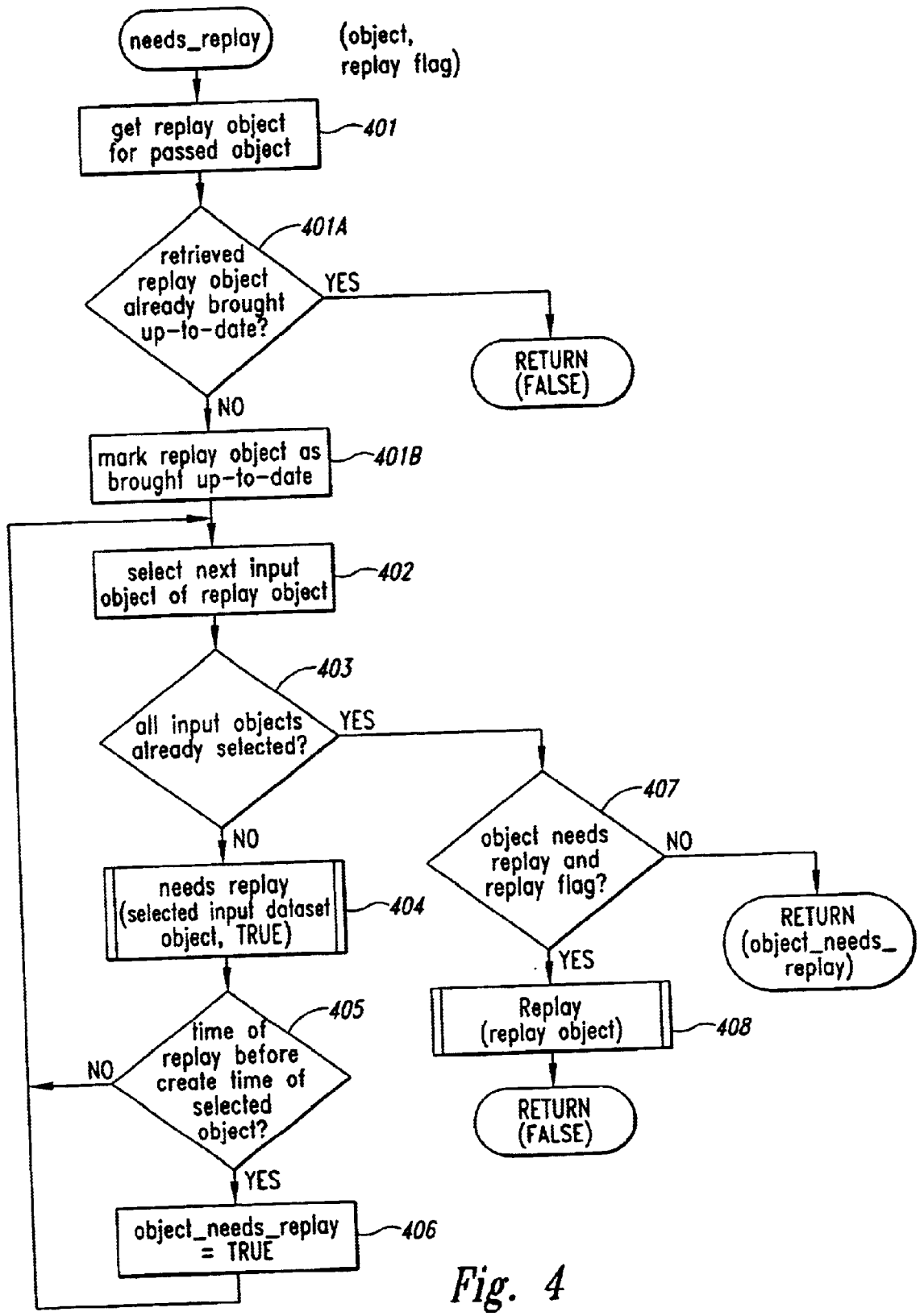
FIG. 4 is a flow diagram illustrating an example implementation of the needs$_{13}$ replay routine of the replay system.

FIG. 4 is a flow diagram illustrating an example implementation of the needs_replay routine of the replay system. When a service is requested to ensure that an output data set object is up-to-date, the service invokes this routine to ensure that all the input data set objects necessary to generate the output data set objects are up-to-date and to indicate whether the output data set object needs to be regenerated. This routine also optionally regenerates the output data set as indicated by a passed flag. If a replay object generates multiple output data sets that are input to another replay object, then when the session for that other replay object is replayed, it may ensure that the input data sets of that replay object are up-to-date multiple times-once for each of the multiple output data sets. Of course, once it is ensured that the output sets are up-to-date during a session, there is no need to repeat the ensuring. To prevent the redundant ensuring, the routine tracks which replay objects have already been brought up-to-date during the session. In step 401, the routine retrieves the replay object for the passed output data set object. The routine also initializes a flag indicating that the retrieved replay object does not need to be replayed. In step 401A, if the retrieved replay object has already been brought up-to-date, during this session, then the routine returns a flag indicating that the passed object does not need to be brought up-to-date, else the routine continues at step 401B. In step 401B, the routine marks the replay object as already being brought up-to-date. In one embodiment, the routine tracks the replay objects that have already been brought up-to-date by creating an entry in a hash table for an object identifier of the replay object. In steps 402–406, the routine loops ensuring that any input data set objects of the passed output data set object are up-to-date. The routine recursively invokes the needs_replay routine for each input data set object indicating that the input data set object is to be brought up-to-date, if not currently up-to-date. In step 402, the routine selects the next input data set object of the retrieved replay object. In step 403, if all the input data set objects have already been selected, then the routine continues at step 407, else the routine continues at step 404. In step 404, the routine recursively invokes the needs_replay routine passing the selected input data set object and an indication to bring the selected input data set object up-to-date, if not already up-to-date. In step 405, if the time stamp of the retrieved replay object is before the time stamp of the selected input data set object, then the passed output data set object may be out-of-date and the routine continues at step 406, else the routine loops to step 402 to select the next input data set object of the retrieved replay object. In step 406, the routine sets a flag to indicate that the session corresponding to the retrieved replay object needs to be replayed and then loops to step 402 to select the next input data set object. In step 407, if the passed replay flag indicates that the passed output data set object should be brought up-to-date and the passed output object data set may not up-to-date, then the routine continues at step 408, else the routine returns a flag indicating whether the passed output data set object needs to be brought up-to-date. In step 408, the routine invokes a routine to replay the session of the retrieved replay object to bring the passed output data set object up-to-date and then returns an indication that the data set object is up-to-date.

Figure 5:
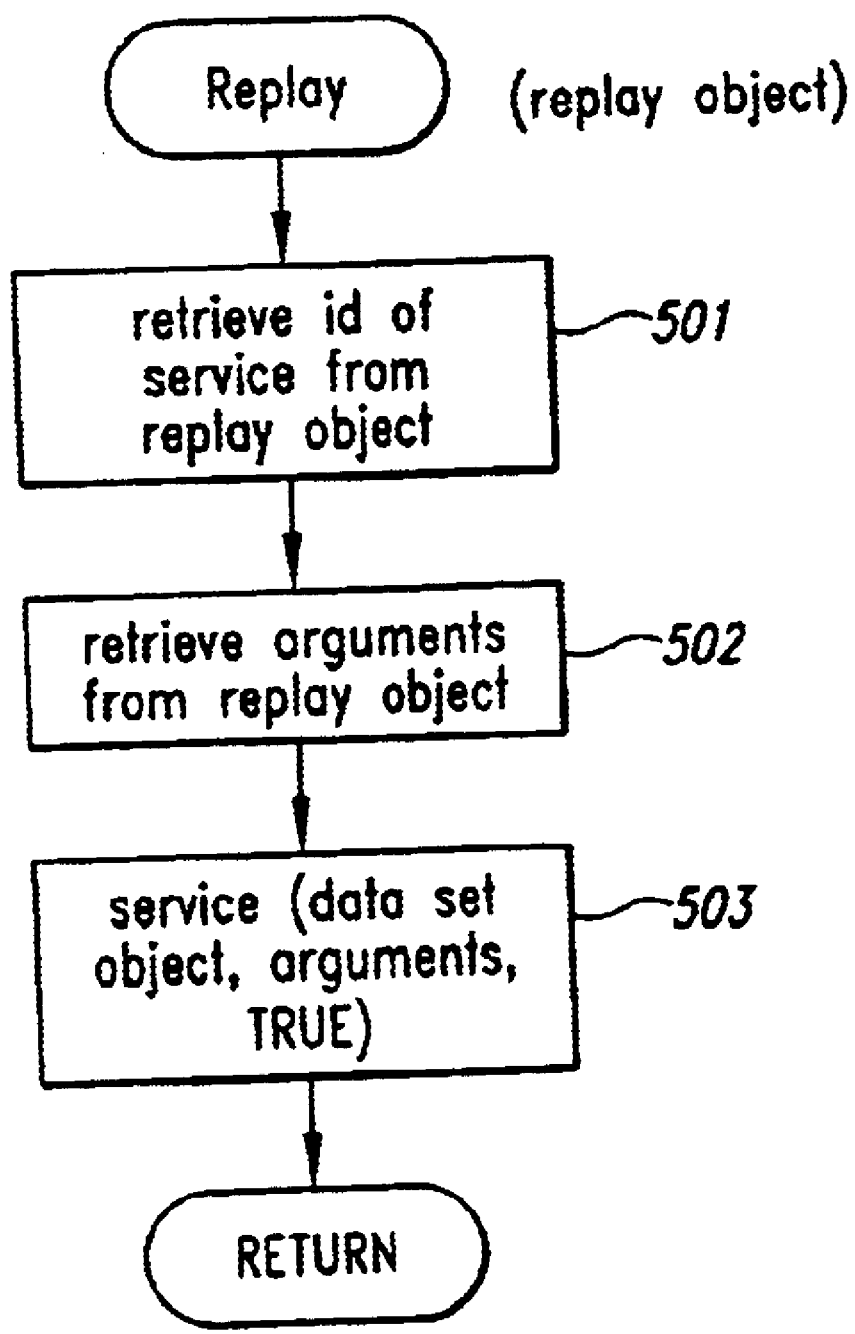
FIG. 5 is a flow diagram of an example implementation of the replay routine.

FIG. 5 is a flow diagram of an example implementation of the replay routine. This routine is passed a replay object and replays the session that recorded the replay object. In step 501, the routine retrieves the identification of the service from the passed replay object. In step 502, the routine retrieves the arguments from the passed replay object. In step 503, the routine invokes the identified service passing the arguments and a flag indicating that the input data set objects are up-to-date. The routine then returns.

Figure 6:
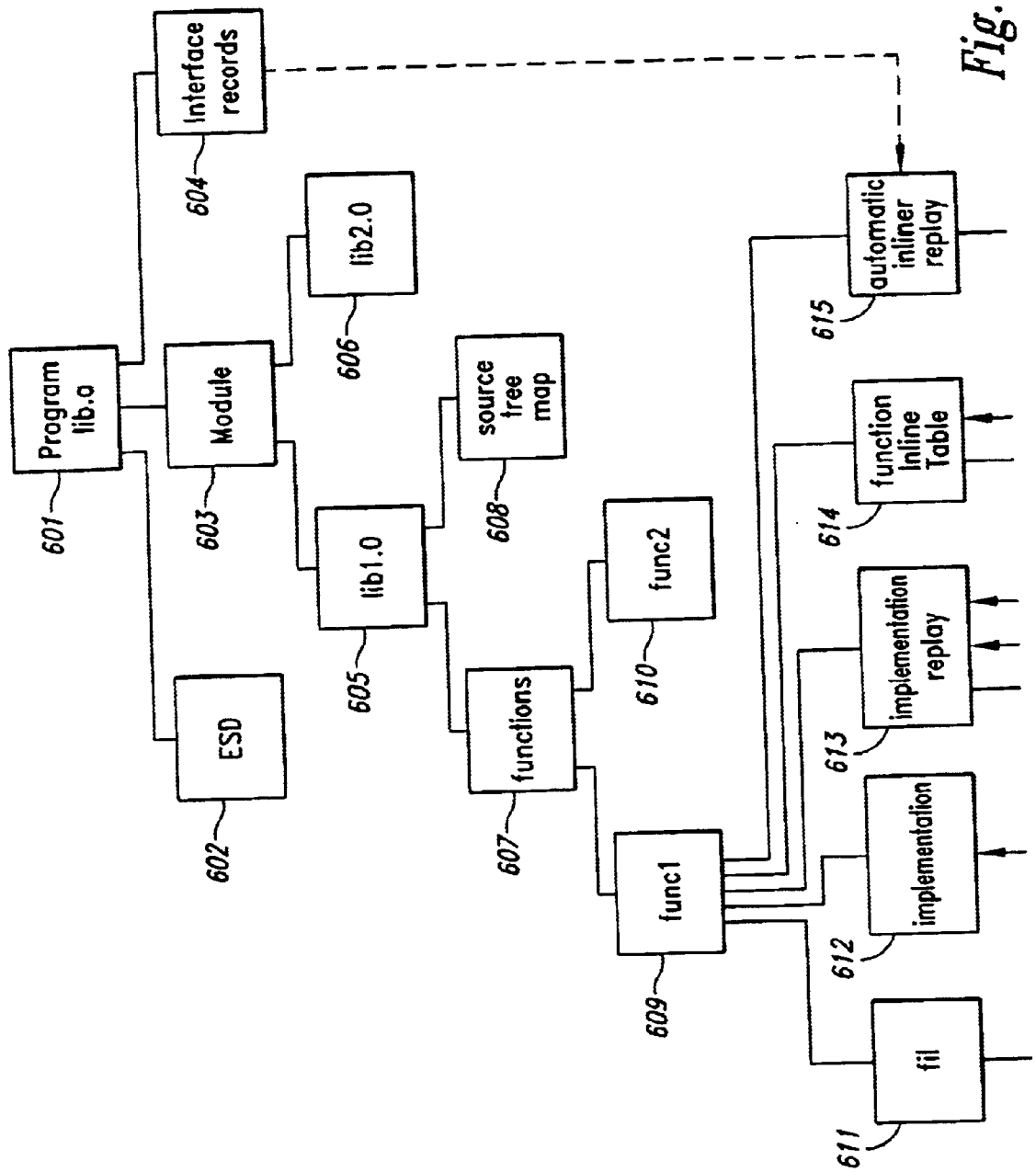
FIG. 6 illustrates a program library that the development environment uses to store information about a computer program.

FIGS. 6–9 illustrate an example use of the replay system by a computer program development environment. The development environment provides services for generating front-end intermediate language code from source code in different programming languages and for generating object code from the front-end intermediate language code. FIG. 6 illustrates a program library, a collection of objects, that the development environment uses to store information about a computer program. The information in the program library is organized hierarchically. Node 601 represents the computer program "lib.a" and is the root of the hierarchy. Node 602 contains the external symbol dictionary for the computer program "lib.o". The external symbol dictionary contains the name of each symbol of the computer program that is declared to be external by a function of the computer program and an indication of where the external symbols are defined. The external symbol for a function may be defined within another function within the computer program or defined in a library external to the computer program. Node 604 contains interface records for the computer program. The interface records contain information used by an automatic inliner service indicating where functions should be stored inline rather than having an invocation to the functions. When a function is updated, each of the functions that have the updated function stored inline becomes out-of-date and needs to be updated. Node 603 contains a list of each of the modules, "lib1.o" of node 605 and "lib2.o" of node 606, of the computer program. Node 605 contains the functions of the modules in node 607 and a source tree map for the module in node 608. The source tree map contains a cross reference between the front-end intermediate language code to source files (not shown) and line numbers. In this example, the module "lib1.o" contains two functions, "func1" of node 609 and "func2" of node 610. Node 611 contains the front-end intermediate language code of the function "func1." Node 612 contains object code generated from the front-end implementation language for the function "func1." Node 613 contains the information necessary to regenerate the object code for function "func1." The function inline table node 614 contains information primarily for that indicating that an inline function of function "func1" has been changed. Node 615 is a replay object for the automatic inliner service. When the front-end translator generates the front-end intermediate language code, it generates the automatic inliner replay object so that whenever relevant portions of the interface records of node 604 change, the function inline table of node 614 is also changed. In this way, the development environment can determine to regenerate the implementation when an inline function has changed. The dashed lines indicate the input and outputs of the replay objects.

Figure 7:
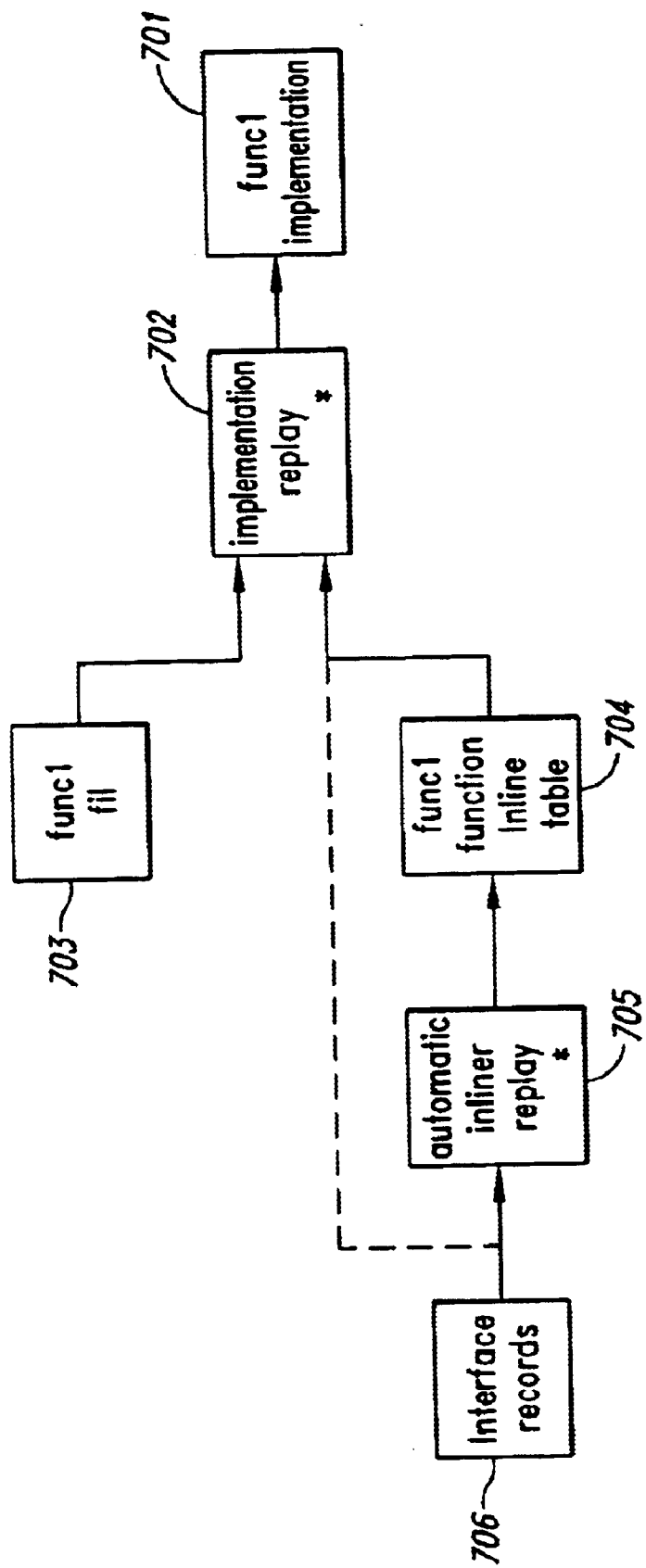
FIG. 7 illustrates the data set object and replay object organization for the program library of FIG. 6.

FIG. 7 illustrates the data set object and replay object organization for the program library of FIG. 6. Data set object 701 corresponds to the node 612 and is the output data set of the implementation replay object 702 corresponding to node 613. The replay object 702 represents a session for generating output data set object 701 from input data set objects 703 and 704. Data set object 703 represents the front-end intermediate language code of node 611. Data set object 704 represents the function inline table of node 614. Data set object 704 is an output data set object of the automatic inliner replay object 705 of node 615. Data set object 706 represents the interface records of node 604. When the implementation represented by data set object 701 is accessed, the replay system determines whether data set object 701 is up-to-date. In doing so, the replay system determines whether input data set object 704 is up-to-date. Data set object 704 is up-to-date if the time stamp of data set object 706 is less than a time stamp of replay object 705. Because the interface records of node 604 contains information relating to all the functions in the program library, the interface records may be updated whenever any function in the program library is modified. If the data set object 706 was input directly into replay object 702 (as indicated by the dashed line), then anytime a function was changed, which caused any change to the interface record, the session of replay object 702 would need to be replayed to bring data set object 701 up-to-date. Thus, the replay system would likely regenerate data set object 701 many times when a change in the interface records would result in no change in implementation represented by data set object 701. However, the function inline table of node 614 represents only portions of the interface records of node 604 that pertains to the function of node 609. Thus, when updating the translations of the front-end intermediate language of the functions of the program library, a function will only be retranslated when the portion of the interface records represented by its function inline table has changed. Thus, by separating an aggregate data set object, like a global function inline table, into data set objects representing subsets of the aggregate data set object, like data set object 704, the replaying of complex sessions, such as the translation session of replay object 702, is not performed as a result of a non-relevant portion of the aggregate data set object changing.

Figure 8:
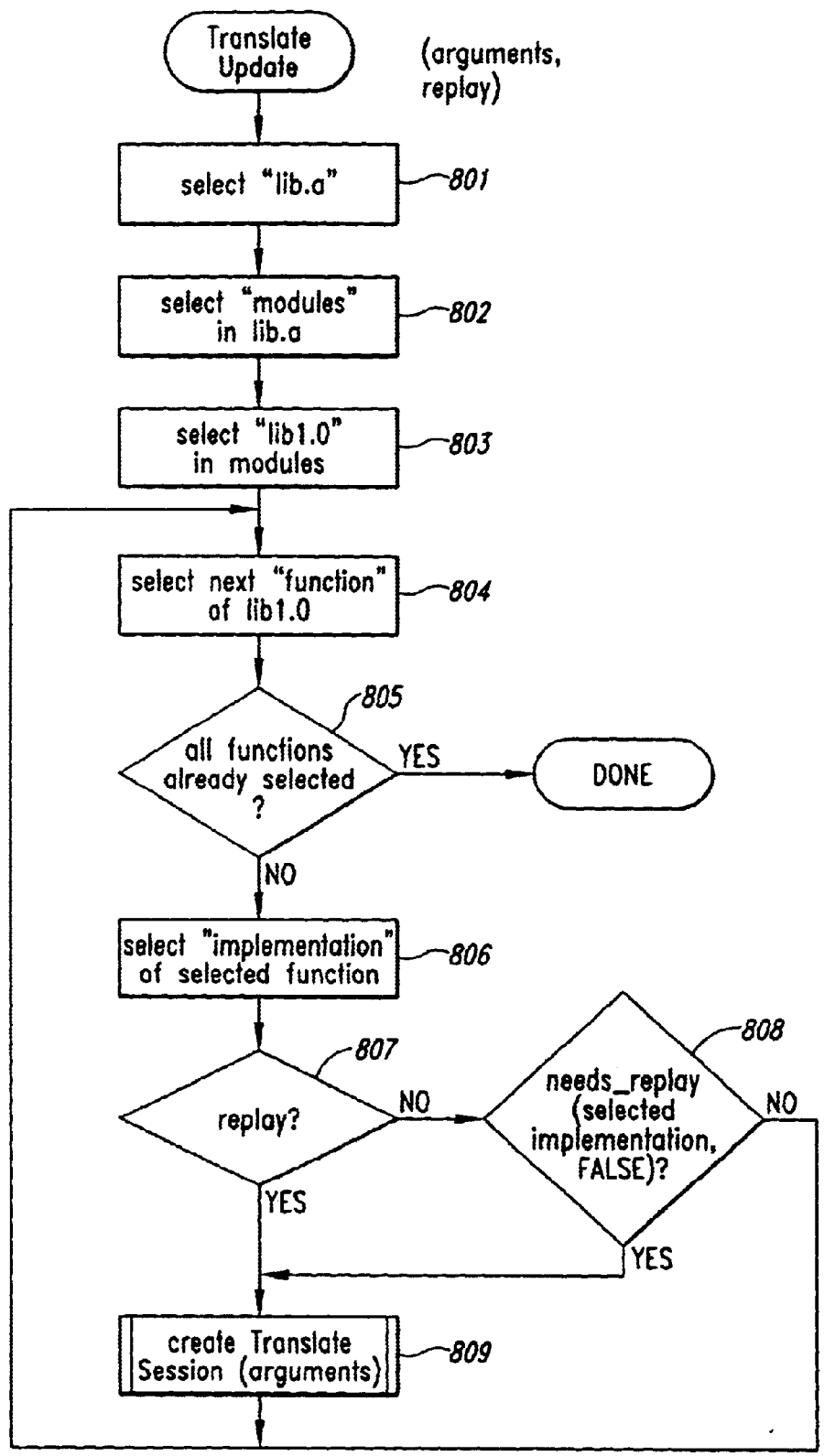
FIG. 8 is a flow diagram of an example implementation of a routine of a service to translate functions within a module of a program library.

FIG. 8 is a flow diagram of an example implementation of a routine of a service to translate functions within a module of a program library. This routine is passed arguments which specify the program library and module name, and a flag indicating whether the input data set objects of the functions within the module are up-to-date. In step 801, the routine selects the root node of the program library indicated by the passed arguments. In step 802, the routines selects the module node within the program library. In step 803, the routine selects a certain module as indicated by the passed arguments within the selected program library. In steps 804–809, the routine loops selecting each function within the selected module and retranslating the selected function if any input used to generate the implementation has changed implementation. In step 804, the routine selects the next function of the selected module. In step 805, if all the functions of the selected module have already been selected, then the translation is complete, else the routine continues at step 806. In step 806, the routine selects the implementation of the selected function. In step 807, if the passed flag indicates that the input data sets are up-to-date, then the routine continues to step 809, else the routine continues at step 808. In step 808, the routine invokes the needs_replay routine passing the selected implementation along with an indication that the implementation should not be regenerated. The invoked routine returns an indication as to whether the selected implementation needs to be regenerated. If the implementation is not up-to-date, then the routine continues at step 809, else the routine loops to step 804 to select the next function of the selected module. In step 809, the routine invokes the routine to translate the function and create a session. The routine then loops to step 804 to select the next function in the selected module.

Figure 9:
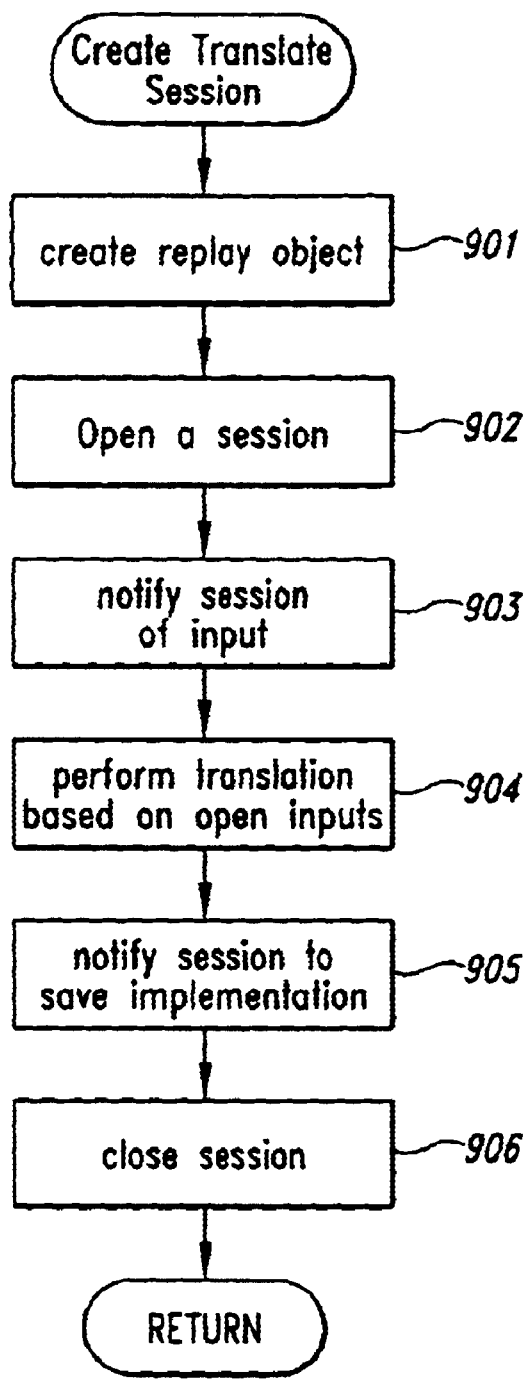
FIG. 9 is a flow diagram of an example implementation of a routine to create a translation session.

FIG. 9 is a flow diagram of an example implementation of a routine to create a translation session. This routine is passed the identification of a front-end intermediate language data set object. In step 901, the routine creates a replay object for the implementation data set object, if one does not exist. In step 902, the routine opens a session. In step 903, the routine notifies the session of the name of the translator service and notifies the session of the arguments that are to be provided to the translator when this session is replayed. In step 904, the routine performs the translation of the front-end intermediate language data set object into the implementation data set object. In step 905, the routine notifies the session to save the implementation data set object. In step 906, the routine closes the session, which updates the time stamp of the implementation data set object (if it has changed) updates the time stamp of the replay object, the routine returns. Although not shown, the routine also creates a replay object for a session that determines whether any of the inlined functions of the implementation have changed.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method in a computer system for updating data sets, the method comprising:
   when generating a data set, monitoring the generation of the data set and recording an identification of a service used to generate the data set and an identification of input data sets for the generation of the data set; and
   when the data set is accessed,
      determining whether the input data sets are up-to-date;
      when an input data set is not up-to-date, regenerating the input data set that is not up-to-date using a service whose identification was recorded when the input data set was generated and indicating if the input data set has changed; and
      when an input data set has been changed since the data set was last generated, regenerating the data set by using the identified service and the identified input data sets to generate an up-to-date data set.

2. The method of claim 1 wherein the input data sets have recorded identifications of services to be used to regenerate the input data sets when they are not up-to-date.

3. The method of claim 2 wherein the identifications of services are recorded in replay objects.

4. The method of claim 3 wherein the data set includes a pointer to the replay object.

5. The method of claim 1 wherein each input data set has a time stamp indicating when it was last changed and wherein the data set is regenerated only when its time stamp is less than a time stamp of an input data set.

6. The method of claim 1 wherein an input data set represents a sub-division of an aggregate data set so that the input data set is changed only when that sub-division of the aggregate data set is changed.

7. The method of claim 1 wherein an aggregate data set is sub-divided into subset data sets so that each subset data set is updated less frequently than the aggregate data set.

8. The method of claim 1 wherein the service is for translating a computer program from one format to another.

9. The method of claim 1 wherein the identifiers are recorded in a replay object having a time stamp and each input data set has a time stamp and wherein the data set is regenerated when the input data sets are up-to-date and the time stamp of an input data set is later than a time stamp of the replay object.

10. The method of claim 9 wherein the time stamp of an input data set is updated only when the input data set changes.

11. The method of claim 9 wherein the time stamp of the replay object is updated whenever the data set is regenerated.

12. The method of claim 9 wherein the time stamp is not updated when the data set is regenerated, but the regenerated data set is the same as before being regenerated.

13. A method in a computer system for updating data sets, the method comprising:
   for each of a plurality of data sets, providing an association of the data set, a service, and an input data set by monitoring that the service generates the data set using the input data set as input; and
   when a data set is to be accessed,
      determining whether the input data set for the data set is up-to-date;
      when it is determined that the input data set for the data set is not up-to-date, regenerating the input data set for the data set using the service and the input data set for the input data set being regenerated to generate an up-to-date input data set for the data set; and
      when the input data set for the data set has been regenerated since the data set was last generated, regenerating the data set using the service and input data set for the data set to generate an up-to-date data set.

14. The method of claim 13 wherein an executing service provides the association of a data set that it generates and an input data set used by the service.

15. The method of claim 13 wherein data sets form a hierarchy of data sets and wherein data sets lower in the hierarchy are used by services to regenerate data sets higher in the hierarchy.

16. The method of claim 13 wherein data sets form a hierarchy of data sets and wherein when one data set in the hierarchy is accessed, determining whether data sets lower in the hierarchy are up-to-date and regenerating data sets that are not up-to-date, and regenerating the one data set only when its input data set has changed as a result of the regeneration of the data sets that are determined not to be up-to-date.

17. The method of claim 13 wherein a data set is regenerated only when its input data set has changed since the data set was last regenerated.

18. The method of claim 13 wherein the association of a data set and a service is provided to a replay object along with a time stamp.

19. The method of claim 18 wherein the time stamp is updated when the data set changes as a result of being regenerated.

20. The method of claim 18 wherein the time stamp is not updated when the data set does not change as a result of being regenerated.

21. The method of claim 13 wherein the providing includes providing an argument to be used by the service to regenerate the data set.

22. A computer-readable medium including instructions for controlling a computer system to ensure that a data set is up-to-date, by a method comprising:
when each of a plurality of data sets is generated, associating with the data set one or more direct input data sets that are directly used to generate the data set by monitoring the generation of the data sets; and
when a data set is to be accessed,
regenerating each indirect input data set that is indirectly used to generate the data set to be accessed when it is determined that a direct input data set associated with that indirect input data set has changed; and
regenerating the data set to be accessed when a direct input data set associated with the data set to be accessed has changed as a result of regenerating an indirect input data set of the data set to be accessed.

23. The computer-readable medium of claim 22 wherein an executing service provides the associating of a data set that it generates with one or more direct input data sets used by the service to directly generate the data set.

24. The computer-readable medium of claim 22 wherein a data set is regenerated only when a direct input data set has changed since the data set was last regenerated.

25. The computer-readable medium of claim 22 wherein the association of a data set to one or more direct input data sets is provided to a replay object along with a time stamp.

26. The computer-readable medium of claim 25 wherein the time stamp is updated when the data set changes as a result of being regenerated.

27. The computer-readable medium of claim 25 wherein the time stamp is not updated when the data set does not change as a result of being regenerated.

28. The computer-readable medium of claim 22 wherein the associating includes providing an argument to be used by a service to regenerate the data set.

29. A computer-based replay system comprising:
means for monitoring the generation of a data set and storing an association between the data set and a service, and an input data set used to generate the data set;
means for determining whether the data set is up-to-date;
means for regenerating the input data set is up-to-date to bring it up-to-date; and
means for executing the service to regenerate the data set using the input data set when the input data set has been regenerated as a result of ensuring that the input data set is up-to-date.

30. The replay system of claim 29 wherein the means for executing records a time stamp indicating when the data set has changed and wherein it is determined the input data set has changed when its time stamp is later than the time stamp of the data set.

31. The replay system of claim 29 wherein the means for determining receives an argument that is used to regenerate the data set.

32. The replay system of claim 29 wherein the means for determining is based on an indication of the service when it generates the data set.

33. The replay system of claim 29 including means for identifying a replay object for the input data set.

34. The replay system of claim 33 wherein the means for identifying the replay object includes a pointer to the replay object.

35. A method in a computer system for generating data sets, the method comprising:
providing by monitoring the generation of data sets an indication that a first data set is generated by a first service with a second data set as input and an indication that the second data set is generated by a second service with a third data set as input;
determining whether the second data set is up-to-date;
when it is determined that the second data set is not up-to-date, regenerating the second data set using the second service with the third data set as input; and
when the second data set has been regenerated since the first data set was last generated, regenerating the first data set using the first service with the second data set as input.

36. The method of claim 35 wherein the determining of whether a data set is up-to-date includes determining whether input data sets that are directly or indirectly used to generate the data are up-to-date.

37. The method of claim 36 wherein the second data set represents a subdivision of an aggregate data set so that the second data set is regenerated only when that subdivision of the aggregate data set is changed.

38. The method of claim 37 wherein the aggregate data set is sub-divided into subset data sets so that each subset data set is updated less frequently than the aggregate data set.

39. The method of claim 35 wherein the first service is a service for translating a computer program from one format to another.

40. The method of claim 35 wherein the regenerating of the first data set is performed under control of a first replay object.

41. The method of claim 40 wherein the regenerating of the second data set is performed under control of a second replay object.

42. A computer system for generating data sets, comprising:
a component that monitors the generation of a first data set and stores an indication that the first data set is generated by a first service with a second data set as input and that monitors the generation of the second data set and stores an indication that the second data set is generated by a second service with a third data set as input;
a component that determines whether the second data set is up-to-date and, when it is determined that the second data set is not up-to-date, regenerates the second data set using the second service with the third data set as input; and
a component that regenerates the first data set using the first service with the second data set as input when the second data set has changed since the first data set was last generated.

43. The computer system of claim 42 wherein the determining of whether a data set is up-to-date includes determining whether input data sets that are directly or indirectly used to generate the data are up-to-date.

44. The computer system of claim 43 wherein the second data set represents a sub-division of an aggregate data set so that the second data set is regenerated only when that subdivision of the aggregate data set is changed.

45. The computer system of claim 44 wherein the aggregate data set is subdivided into subset data sets so that each subset data set is updated less frequently than the aggregate data set.

46. The computer system of claim 42 wherein the first service is a service for translating a computer program from one format to another format.

47. The computer system of claim 42 wherein the regenerating of the first data set is performed under control of a first replay object.

48. The computer system of claim 47 wherein the regenerating of the second data set is performed under control of the second replay object.

49. The method of claim 1 wherein the monitoring includes receiving from the service that generates the data set an indication of the data set and the input data sets.

50. The method of claim 1 wherein the monitoring includes receiving from the service that generates the data set an indication of the data set, the service, and the input data sets.

51. The method of claim 13 wherein the monitoring includes receiving from the service that generates the data set an indication of the data set and the input data sets.

52. The method of claim 13 wherein the monitoring includes receiving from the service that generates the data set an indication of the data set, the service, and the input data sets.

53. The computer-readable medium of claim 22 wherein the monitoring includes receiving from the service that generates the data set an indication of the data set and the input data sets.

54. The computer-readable medium of claim 22 wherein the monitoring includes receiving from the service that generates the data set an indication of the data set, the service, and the input data sets.

55. The replay system of claim 29 wherein the monitoring includes receiving from the service that generates the data set an indication of the data set and the input data sets.

56. The replay system of claim 29 wherein the monitoring includes receiving from the service that generates the data set an indication of the data set, the service, and the input data sets.

57. The method of claim 35 wherein the monitoring includes receiving from the service that generates the data set an indication of the data set and the input data sets.

58. The method of claim 35 wherein the monitoring includes receiving from the service that generates the data set an indication of the data set, the service, and the input data sets.

* * * * *

UNITED STATES PATENT AND TRADEMARK OFFICE
CERTIFICATE OF CORRECTION

PATENT NO. : 6,665,688 B1
DATED : December 16, 2003
INVENTOR(S) : Charles David Callahan, II et al.

It is certified that error appears in the above-identified patent and that said Letters Patent is hereby corrected as shown below:

Title page,
Item [56], References Cited, U.S. PATENT DOCUMENTS, add the following:

-- 4,872,167 A    10/1989    Maezawa et al.
   5,504,932 A    4/1996     Vassiliadis et al.
   5,557,761 A    9/1996     Chan
   5,594,864 A    1/1997     Trauben
   5,712,996 A    1/1998     Schepers         --;

"6,094,716 A    7/2000  Jung" should be -- 6,094,716 A  7/2000  Witt --;
FOREIGN PATENT DOCUMENTS, add the following:

-- EP    EP0455966     11/1991
   EP    EP0422945     4/1991
   EP    EP0537098     4/1993
   EP    EP0455966     11/1991
   UK    GB2307760     6/1997
   DE    DE19710252    2/1998
   EP    EP0855648     7/1998
   EP    EP0864979     9/1998    --;

OTHER PUBLICATIONS, add the following:

--    Burton Smith, "The End of Architecture," Keynote Address Presented at the 17th Annual Symposium on Computer Architecture, Seattle, Washington, May 29, 1990.
      Richard Korry et al., "Memory Management in the Tera MTA System," 1995.
      Gail Alverson et al., "Processor Management in the Tera MTA System," 1995.
      Major System Characteristics of the TERA MTA, 1995.
      Roy F. Touzeau, "A Fortran Compiler for the FPS-164 Scientific Computer," Proceedings of the ACM SIGPLAN '84 Symposium on Compiler Construction, SIGPLAN Notices 19(6):48-57, June 1984.
      Mark A. Linton, "The Evolution of Dbx," USENIX Summer Conference, June 11-15, 1990.
      David Callahan and Burton Smith, "A Future-Based Parallel Language for a General-Purpose Highly-Parallel Computer, Languages and Compilers for Parallel Computing," MIT Press, 1990.
      David Callahan et al., "Improving Register Allocation for Subscripted Variables," Proceedings of the ACM SIGPLAN Conference on Programming Language Design and Implementation, White Plains, New York, June 20-22, 1990.
      Chaudhuri Sarajit and Umeshwar Dayal, "An Overview of Data Warehousing and OLAP Technology," Sigmod Record, Association for Computing, New York, Vol. 26, No. 1, March 1997.

UNITED STATES PATENT AND TRADEMARK OFFICE
CERTIFICATE OF CORRECTION

PATENT NO. : 6,665,688 B1
DATED : December 16, 2003
INVENTOR(S) : Charles David Callahan, II et al.

It is certified that error appears in the above-identified patent and that said Letters Patent is hereby corrected as shown below:

Title page (cont'd),

Brad Adelberg et al., "The Strip Rule System for Efficiently Maintaining Derived Data," Sigmod Record, Association for Computing, New York, Vol. 26, No. 2, June 1, 1997.
Gagan Agrawal and Joel Saltz, "Interprocedural Data Flow Based Optimizations for Compilation of Irregular Problems," Annual Workshop on Languages and Compilers for Parallel Computing, 1995.
David Callahan, "Recognizing and Parallelizing Bounded Recurrences," Aug. 1991.
D.H. Bailey et al., "The NAS Parallel Benchmarks – Summary and Preliminary Results," Numerical Aerodynamic Simulation (NAS) Systems Division, NASA Ames Research Center, California, 1991.
Robert Alverson et al., "The Tera Computer System," Proceedings of 1990 ACM International Conference on Supercomputing, June 1990.
Gail Alverson et al., "Scheduling on the Tera MTA," Job Scheduling Strategies for Parallel Processing, 1995.
Burton Smith, "The Quest for General-Purpose Parallel Computing."
Preston Briggs and Keith D. Cooper, "Effective Partial Redundancy Elimination," ACM SIGPLAN Notices, Association for Computing Machinery, New York, Vol. 29, No. 6, June 1, 1994.
Cliff Click, "Global Code Motion, Global Value Numbering," ACM SIGPLAN Notices, Association for Computing Machinery, New York, Vol. 30, No. 6, June 1, 1995.
Vugranam C. Sreedhar and Guang R. Gao, "Incremental Computation of Dominator Trees," ACM SIGPLAN Notices, Association for Computing Machinery, New York, Vol. 30, No. 3, March 1, 1995.
Jim Galarowicz et al., "Analyzing Message Passing Programs on the Cray T3E with PAT and VAMPIR," Research Report, "Online!", May 1998.
Jennifer Anderson et al., "Continuous Profiling: Where Have All The Cycles Gone?" Operating Systems Review, ACM Headquarters, New York, Vol. 31, No. 5, Dec. 1, 1997
Gail Anderson et al., "Tera Hardware-Software Cooperation," Proceedings of Supercomputing 1997, San Jose, California, November 1997. --;

Column 2,
Line 36, "needs$_{13}$replay" should be -- needs_replay --;

Signed and Sealed this

Sixth Day of April, 2004

JON W. DUDAS
*Acting Director of the United States Patent and Trademark Office*